Sept. 20, 1932.  E. J. OVINGTON  1,878,534
ELECTRIC MOTOR
Filed May 8, 1929
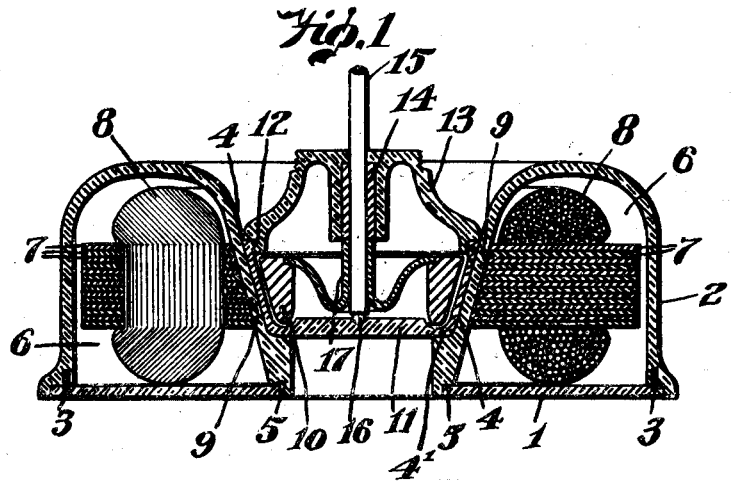
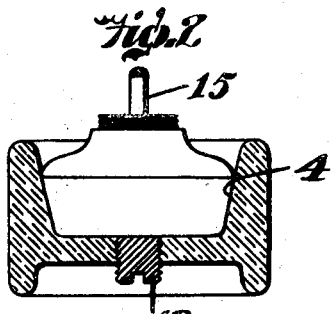
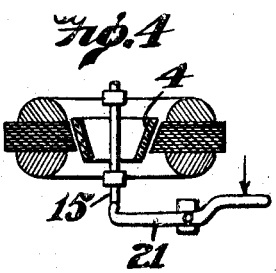
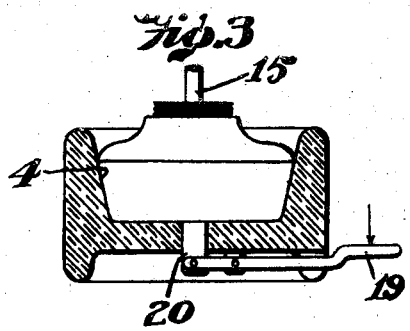
Inventor
Edward J. Ovington
By Ellis Spear
Attorney Patented Sept. 20, 1932

1,878,534

UNITED STATES PATENT OFFICE

EDWARD J. OVINGTON, OF AUBURNDALE, MASSACHUSETTS, ASSIGNOR TO OVINGTON COMPANY, OF CAMBRIDGE, MASSACHUSETTS, A CORPORATION OF MASSACHUSETTS

ELECTRIC MOTOR

Application filed May 8, 1929. Serial No. 361,452.

This invention relates to electric motors and as showing a definite application thereof of a definite use I shall describe and illustrate my motor in its adaptation to a drink mixer of the type disclosed in prior Patents Nos. 1,420,773 and 1,420,774 dated June 27, 1922, to which reference is made as indicative of the general problems involved. It is to be understood, however, that such reference is purely illustrative and in no way limiting and that the principles involved are applicable to a wide variety of motors for a wide variety of uses.

Considering, however, for the purpose of this application, the drink mixer and motor therefor as typical of one of such uses, it is important to note at the outset that with such a motor the rotor and stator are not mechanically bound together, such rotor being constructed as a separable unit to which the mixing cup of the drink mixer is fastened and by means of which the mixer in the cup is rotated.

Where both the rotor and stator have been cylindrical and correspondingly received one within the other, as in the prior patents hereinbefore referred to, it has been necessary to leave sufficient clearance between these two elements to permit an easy withdrawal of the rotor from within the stator. This mechanical clearance, when considered as increased magnetic air gap, decreases the efficiency of the motor to the point where in practice it has been found impossible to get enough power across the air gap properly and speedily to mix or whip a thick material.

To the end therefore of avoiding these objections to prior art constructions, and at the same time providing an electric motor which will embody that operating efficiency as regards power output and stamina so clearly demanded when used in a drink mixer for example, I have devised my present invention. According to it, I make the inductive surfaces of my rotor and stator with a slight taper and thereby make it possible to considerably decrease the so-called air gap between them. Because of these surfaces being tapered the size of the air gap is reduced to the minimum, and ready axial displacement of these two elements is not hampered, thus materially increasing the power output of the motor over one of the common type having cylindrical inductive surfaces as shown in the two patents heretofore listed.

In the accompanying drawing I show one specific embodiment of my invention which I have found well adapted for the attainment of the foregoing desiderata, and indicate in conjunction therewith several permissive variations illustrative of modifications well within the purview of my invention.

In the drawing:

Fig. 1 is a vertical central section through a motor in accordance with my present invention, the field winding of the stator being shown partly in section and partly in elevation for clearness of disclosure, and Figs. 2, 3 and 4 are details showing a few permissible variations particularly as regards the means for obtaining a gradual and progressive increase of power.

My motor is generally similar in type to those disclosed in the said prior patents in that it is of the type wherein the stator and the rotor are axially displaceable relative to each other. As such, it comprises a base 1 and a stator housing 2 which for convenience of access may be relatively detachably assembled, as indicated at 3. The shape of the housing 2 is such as to present an internal tapered bore 4 including an internal annular supporting portion 5 adjacent the base and an enclosing annular chamber 6 within which the stator field is assembled, such field including the superposed slotted stator laminæ 7 and the stator coils 8.

The stator laminæ 7 are tapered along their inner marginal edges, as indicated at 9, such taper corresponding substantially to the taper of the adjacent wall 4 of the housing.

The rotor element is tapered to correspond to the taper of the bore 4 and includes a tapered rotor ring 10 and a tapered rotor housing or shell 11 enclosing said ring and seating on said internal support 4' of the stator housing. The rotor shell 11 has screw threaded or other separable connection, as at 12 with a surmounting section thereof 13 constituting a bearing carrier for a spindle bearing 14, the spindle being indicated at 15 and itself having bearing at its lower end on a ball thrust bearing 16 carried by the lower section 11 of the two-part rotor shell 11—13 and between said ball thrust and the bearing 14 being journaled in a sleeve 17 carried by the rotor ring 10 internally thereof.

By thus correspondingly tapering the field and its field piece, I am able considerably to reduce the size of the air gap between stator and rotor, thus materially increasing the power output as compared with a motor of similar horsepower but of cylindrical bore.

In conjunction with such a motor, or as an adjunct to the old style motor of similar type, I may provide means whereby the rotor may be gradually and progressively brought into inductive relation to the stator, thus gradually increasing the power transferred across the decreasing air gap to the rotor and also to relieve motor strain in overcoming starting inertia. Any of the usual adjustments for effecting this may be employed and I have indicated several of a wide variety of such forms in Figs. 2, 3 and 4.

Referring to Fig. 2, the stator is shown as provided with a screw adjustment, the screw being indicated at 18 in said figure.

In Fig. 3, the adjustment is by means of a lever 19, and link 20, and in Fig. 4, the lever 21 directly supports the lower end of the spindle 15.

Any of these adjustments enables the rotor gradually and progressively to be lowered into the field of the stator, and such adjustments may be employed either with a motor of standard design or as shown in Fig. 4 with a motor embodying the new features particularly detailed in Fig. 1.

From the foregoing description taken in connection with the drawing it will be noted that I have provided a motor in which the rotor and stator are not mechanically connected together in any way and hence avoids the necessity for more or less complicated mechanical connections between the parts and the collateral necessity of disconnecting such parts when it is desired to separate the stator and rotor. In my construction the rotor simply rests snugly by the force of gravity alone within the stator without any mechanical or other connections thereby maintaining a very close air gap and hence being capable of instant and easy separation from each other whenever desired.

Various modifications in the construction and operation of my device may obviously be resorted to if within the spirit and scope of my invention without departing from the limits of the appended claims.

What I therefore claim and desire to secure by Letters Patent is:

1. In an electric motor, a stator, and a rotor adapted to be removably inserted within said stator, said stator having a tapered bore and a tapered housing, said rotor having its outer surface tapered substantially to correspond to the taper of the stator bore and having a shell tapered substantially to correspond to the taper of the stator housing so that the rotor may rest within the stator with the minimum air gap therebetween and without positive mechanical connection therewith except for the rotor shell.

2. In an electric motor, a stator, and a rotor adapted to be removably inserted within said stator, said stator having a tapered bore and a tapered housing and said rotor having a tapered outer surface and a tapered shell, the tapering of said stator bore, stator housing, rotor surface and rotor shell all substantially corresponding to each other so that the rotor may rest within the stator with the minimum air gap therebetween and without positive mechanical connection therewith except for the rotor shell.

3. In a drink mixer, an electric motor comprising a stator having a tapered bore and a tapered stator housing, and a tapered rotor adapted to be removably inserted within said stator and having a tapered shell substantially corresponding with the taper of said stator housing and bore, said rotor resting within the stator with the minimum air gap therebetween and without positive mechanical connection therewith except for the rotor shell so as to permit ready and easy withdrawal of the rotor from the stator.

4. In a drink mixer, an electric motor comprising a stator having a tapered bore and a tapered stator housing, and a tapered rotor adapted to be removably inserted within said stator and having a tapered shell substantially corresponding with the taper of said stator housing and bore, and means whereby said rotor may be adjustably displaced relative to said stator to permit the air gap therebetween to be varied, said rotor resting within the stator with the minimum air gap therebetween and without positive mechanical connection therewith except for the rotor shell so as to permit ready and easy withdrawal of the rotor from the stator.

In testimony whereof I affix my signature.

EDWARD J. OVINGTON.